United States Patent
Chang

(10) Patent No.: US 10,956,963 B2
(45) Date of Patent: Mar. 23, 2021

(54) INTELLECTUAL SHOPPING SYSTEM AND INTELLECTUAL SHOPPING METHOD

(71) Applicant: JESS-LINK PRODUCTS CO., LTD., New Taipei (TW)

(72) Inventor: Shu-Mei Chang, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 197 days.

(21) Appl. No.: 16/181,700

(22) Filed: Nov. 6, 2018

(65) Prior Publication Data

US 2019/0197600 A1 Jun. 27, 2019

(30) Foreign Application Priority Data

Dec. 27, 2017 (TW) .................................. 106146075

(51) Int. Cl.
*G06Q 30/06* (2012.01)
*G06Q 20/20* (2012.01)
(Continued)

(52) U.S. Cl.
CPC ... *G06Q 30/0635* (2013.01); *G06K 19/06028* (2013.01); *G06Q 20/208* (2013.01);
(Continued)

(58) Field of Classification Search
None
See application file for complete search history.

(56) References Cited

U.S. PATENT DOCUMENTS 3,846,947 A * 11/1974 Short ........................ E04H 3/02
52/236.3
8,856,033 B2 * 10/2014 Hicks ..................... G06Q 20/20
705/17

(Continued)

FOREIGN PATENT DOCUMENTS

| CA | 2809523 A1 | 4/2012 |
| CA | 2944105 A1 | 10/2016 |

(Continued)

OTHER PUBLICATIONS

Sowell, Thomas, "Ethnic America: A History", Chapter 5, pp. 100-129. (Year: 1981).*

(Continued)

*Primary Examiner* — Nicholas D Rosen
(74) *Attorney, Agent, or Firm* — Chun-Ming Shih; HDLS IPR Services

(57) ABSTRACT

An intellectual shopping system includes a scanning apparatus, a cloud server, and an application program installed in a mobile device. The mobile device is bound to the scanning apparatus through the application program. When shopping physically, the scanning apparatus is used to scan sensing data of a merchandise item for uploading to the cloud server. The cloud server queries a database for corresponding merchandise information based on the sensing data, adds the merchandise information to a virtual shopping cart, and transmits the merchandise information to the mobile device for displaying. Upon receiving an external operation through the application program, the mobile device performs a checkout action for the virtual shopping cart. Further, the merchandise of the virtual shopping cart is delivered directly from a warehouse to a designated address by a logistic system after the checkout action, with no need for a consumer to convey the merchandise by himself/herself.

15 Claims, 8 Drawing Sheets

(51) Int. Cl.
   *G07G 1/00*    (2006.01)
   *G06K 19/06*   (2006.01)
(52) U.S. Cl.
   CPC ........... *G06Q 30/06* (2013.01); *G07G 1/0081* (2013.01); *G06K 19/06037* (2013.01); *G06Q 30/0641* (2013.01)

(56) References Cited

U.S. PATENT DOCUMENTS

| | | | |
|---|---|---|---|
| 9,894,693 B2* | 2/2018 | Wang | H04W 12/04 |
| 10,002,273 B1* | 6/2018 | Dreselly Thomas | G06K 19/06028 |
| 10,032,126 B2* | 7/2018 | Schmidt | G06Q 10/083 |
| 10,360,571 B2* | 7/2019 | Garel | G06Q 30/0224 |
| 10,438,274 B2* | 10/2019 | Turlay | G07G 1/009 |
| 2001/0032134 A1* | 10/2001 | Hardesty | G06Q 30/0238 705/14.18 |
| 2008/0046331 A1* | 2/2008 | Rand | G06Q 30/00 705/26.81 |
| 2011/0149341 A1* | 6/2011 | Ko | G06F 3/1204 358/1.15 |
| 2011/0218730 A1* | 9/2011 | Rider | G01C 21/00 701/533 |
| 2014/0089077 A1* | 3/2014 | Zuckerman | G07F 9/026 705/14.37 |
| 2014/0164149 A1* | 6/2014 | Huff | G06Q 30/0641 705/14.73 |
| 2014/0249942 A1* | 9/2014 | Hicks | G06Q 20/20 705/17 |
| 2015/0025936 A1* | 1/2015 | Garel | G06Q 30/0269 705/7.29 |
| 2015/0282223 A1* | 10/2015 | Wang | H04W 12/0023 455/41.2 |
| 2016/0005019 A1 | 1/2016 | Paulo | |
| 2016/0171486 A1* | 6/2016 | Wagner | G06Q 20/3278 705/39 |
| 2016/0277875 A1* | 9/2016 | Ivanova | H04W 76/14 |
| 2016/0371650 A1* | 12/2016 | Schmidt | G06Q 10/083 |
| 2017/0262933 A1* | 9/2017 | Chuah | G06Q 10/083 |
| 2017/0279896 A1* | 9/2017 | Kelly | H04L 67/20 |
| 2018/0068374 A1* | 3/2018 | Turlay | G07G 1/009 |

FOREIGN PATENT DOCUMENTS

| | | |
|---|---|---|
| CN | 106741083 A | 5/2017 |
| CN | 107153954 A | 9/2017 |
| TW | I552097 B * | 10/2016 |

OTHER PUBLICATIONS

Office Action dated Sep. 26, 2018 of the corresponding Taiwan patent applicaiton.

Search Report dated Mar. 13, 2019 of the corresponding European patent application.

Examination Report dated Sep. 24, 2020 of the corresponding European patent application No. EP18190425.1.

* cited by examiner

INTELLECTUAL SHOPPING SYSTEM AND INTELLECTUAL SHOPPING METHOD

BACKGROUND OF THE INVENTION

1. Technical Field

The technical field relates to a shopping system and a shopping method, and specifically relates to an intellectual shopping system and intellectual shopping method.

2. Description of Related Art

The Internet has become popular in recent years, and the shopping behavior of consumers is transformed from physical shopping into online shopping. By way of online shopping activities, consumers can surf the Internet at home through personal computers or mobile devices without going outside, and directly shop on the Internet, which is very convenient.

Though the online shopping activities are convenient, the consumers are unable to see the physical merchandise with their bare eyes and are incapable of touching the physical merchandise when shopping online, and this is the reason why the return rates of online shopping activities are so high and difficult to reduce. Accordingly, the selling costs of the online sellers are increased, and the sellers cannot accurately realize the real demand of the consumers.

Because of the aforementioned problem, parts of the consumers are more likely to shop in physical stores even if online shopping activities have higher convenience. However, when performing physical shopping activities in the physical stores, the consumers usually need to convey the merchandise themselves by using a shopping cart. If the quantities of the merchandise the consumers purchased are too much, the physical stores are too crowded, or the moving routes in the physical stores are too messy, then the moving of the consumers will be a big issue to be solved.

If the physical stores are too crowded, the consumers also have to wait in line for checking out, in a time-wasting manner. Besides, if the consumers have other schedules after shopping, they need to keep company with all the purchased merchandise in the following schedules, which is extremely annoying and inconvenient.

According to the above problems, a novel shopping system is demanded by the market, which may provide the advantages of both physical shopping activities and online shopping activities, so as to improve shopping experiences for the consumers.

SUMMARY OF THE INVENTION

The object of the invention is to provide an intellectual shopping system and an intellectual shopping method, which may provide the advantages of both physical shopping activities and online shopping activities, so as to improve the shopping experiences for the consumers.

To achieve the above object, the intellectual shopping system of the present invention at least includes a scanning apparatus, a cloud server, and an application program installed in a mobile device. The mobile device is bound to the scanning apparatus through executing the application program. When a user performs a physical shopping activity, the scanning apparatus is used to scan sensing data of a merchandise for uploading the sensing data to the cloud server. The cloud server queries a database for corresponding merchandise information based on the sensing data, and then adds the merchandise information to a virtual shopping cart of the user, and transmits the merchandise information to the mobile device for reviewing. Upon receiving an external operation through the application program, the mobile device proceeds to perform a checkout action for the virtual shopping cart. Further, the merchandise of the virtual shopping cart is delivered directly from a warehouse to a designated address by a logistic system after the checkout action, with no need for the user to convey the merchandise by himself/herself.

In comparison with the shopping approaches in related art, the shopping system and shopping method in the present invention may allow the users to experience the joy of physical shopping activities without conveying the merchandise and waiting in line for checking out. Further, the users have already checked the merchandise before buying in the physical stores, so the high return rates of traditional online shopping activities can be effectively solved.

Besides, the users may ask the logistic system to deliver the merchandise from a back-end warehouse directly to a designated address by using the shopping system and shopping method of the present invention; therefore, the storing spaces in the physical stores are effectively saved, and the time cost of replenishing the merchandise and organizing the shelves in the physical stores is greatly reduced.

DETAILED DESCRIPTION OF THE INVENTION

In cooperation with the attached drawings, the technical contents and detailed description of the present invention are described hereinafter according to multiple embodiments, not being used to limit its executing scope. Any equivalent variation and modification made according to appended claims is all covered by the claims claimed by the present invention.

Figure 1:
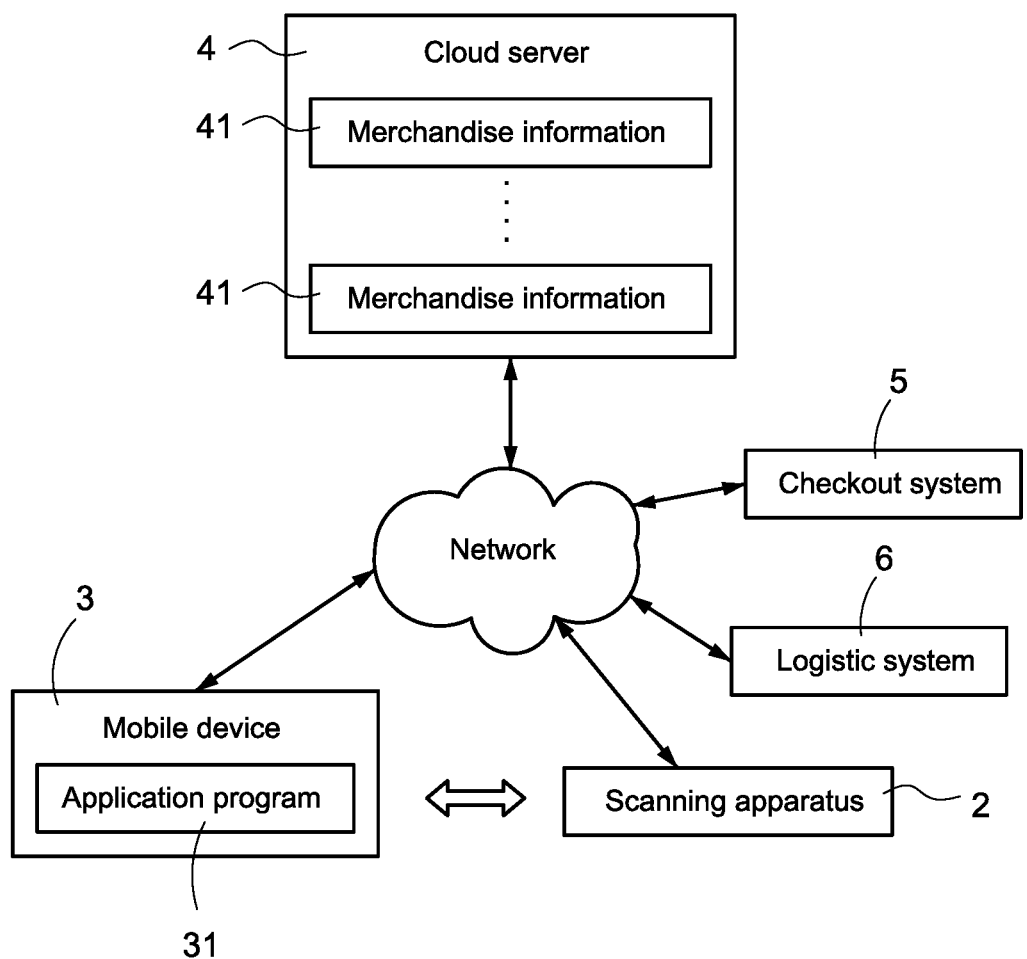
FIG. 1 is a block diagram of a shopping system according to a first embodiment of the present invention.

FIG. 1 is a block diagram of a shopping system according to a first embodiment of the present invention. The present invention discloses an intellectual shopping system (referred to as the shopping system 1 hereinafter), the shopping system 1 may allow consumers to experience the joy of physical shopping activities, and also enjoy the convenience of online shopping activities.

As shown in FIG. 1, the shopping system 1 mainly includes a scanning apparatus 2, a cloud server 4, and an application program 31 which is installed and executed in a mobile device 3, wherein the cloud server 4 is connected and communicates with the scanning apparatus 2 and the mobile device 3 through Internet. Specifically, the cloud server 4, the scanning apparatus 2, and the mobile device 3 in the present invention are capable of bilateral communication and data inquiring with other ends of the shopping system 1 through the Internet. One of the main technical features of the present invention is that a consumer may bind the scanning apparatus 2 to the mobile device 3 through the application program 31, so the consumer is able to select a demanded merchandise via the scanning apparatus 2 and to inquiry for data related to the selected merchandise and proceed to checkout for the merchandise via the mobile device 3.

Figure 3:
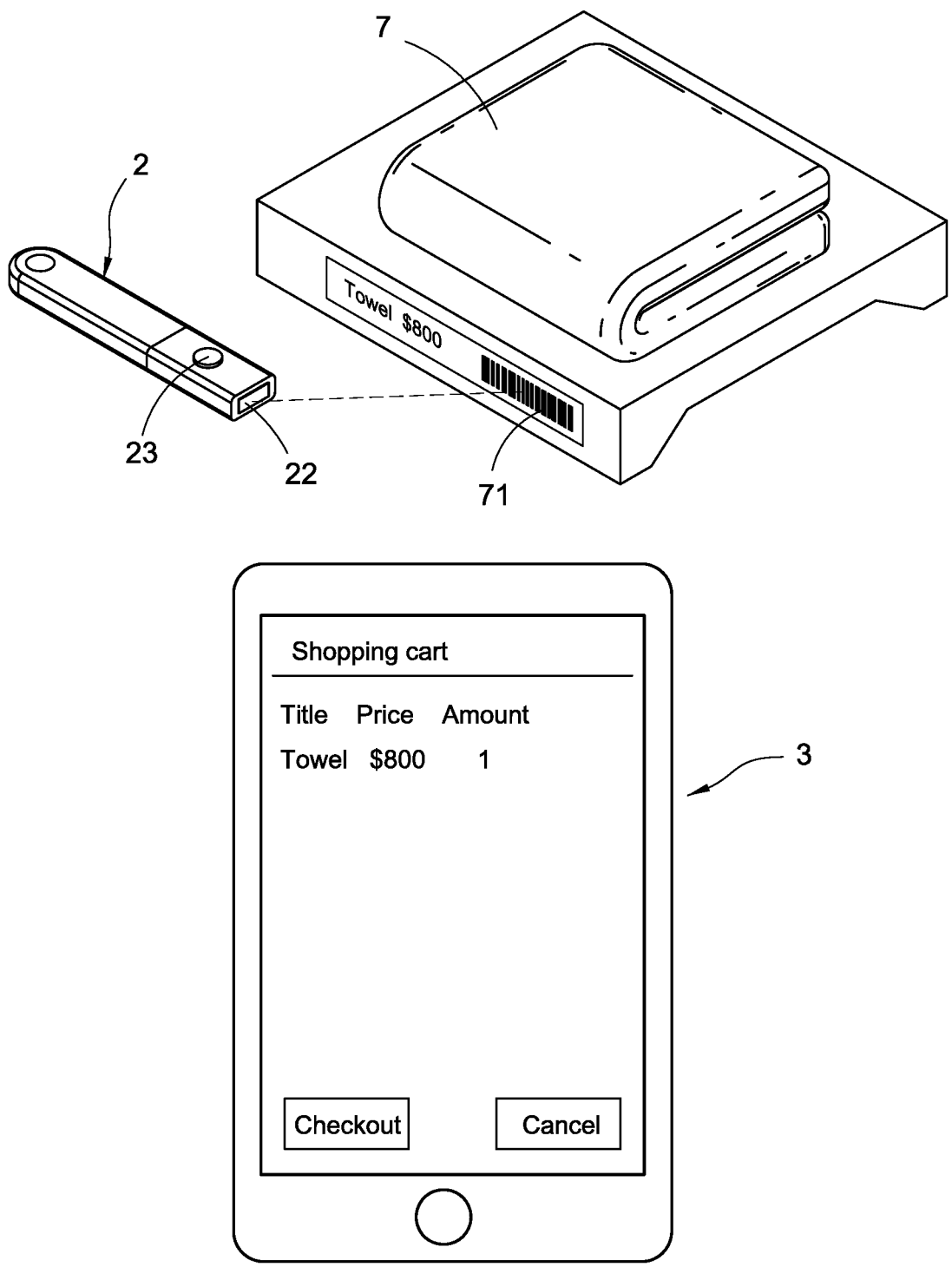
FIG. 3 is a schematic diagram showing a using scenario according to the first embodiment of the present invention.

Please refer to FIG. 3, is a schematic diagram showing a using scenario according to the first embodiment of the present invention. As shown in FIG. 3, when entering into a physical store to perform a physical shopping activity, the consumer may use the scanning apparatus 2 to scan sensing data 71 of a demanded merchandise 7. In the embodiment of FIG. 3, the sensing data 71 is recorded in barcode format. In another embodiment, the sensing data 71 may also be recorded in QR code format, not limited thereto.

The cloud server 4 is connected and communicates with the scanning apparatus 2. After scanning and obtaining the sensing data 71 of the merchandise 7, the scanning apparatus 2 may upload the sensing data 71 to the cloud server 4. The cloud server 4 may receive the sensing data 71 from the scanning apparatus 2, and queries an internal database (not shown) according to the received sensing data 71 for retrieving merchandise information 41 that corresponds to the merchandise 7. In particular, the merchandise information 41 may be, for example, name, price, specification, origin, pictures, ratings, ingredients, etc., of the merchandise 7, but not limited thereto.

As mentioned above, because the scanning apparatus 2 has already bound to the mobile device 3 before using, the scanning apparatus 2 may simultaneously transmit the data related to the mobile device 3 to the cloud server 4 while uploading the sensing data 71 to the cloud server 4. After inquiring for and retrieving the merchandise information 41 of the merchandise 7, the cloud server 4 may add the retrieved merchandise information 41 to a virtual shopping cart of the mobile device 3 (not shown), and transmits the retrieved merchandise information 41 to the mobile device 3 for the consumer to review upon the mobile device 3.

As shown in FIG. 1, the shopping system 1 of the present invention further includes a checkout system 5, which is connected to and communicated with the cloud server 4 through the Internet. In particular, the checkout system 5 is capable of bilateral communication and data inquiring with other ends of the shopping system 1 (such as the mobile device 3, the scanning apparatus 2, etc.) through the Internet. After the mobile device 3 receives an external operation from the consumer (for example, the consumer touches a checkout button upon the mobile device 3 that is provided by the application program 31), the checkout system 5 may proceed to perform a checkout action for all the merchandise information 41 recorded in the virtual shopping cart based on checkout information that is pre-registered in the mobile device 3.

In one embodiment, the consumer may pre-configure the parameters of the application program 31 to register credit card information, Alipay information, ApplePay information, or/and Bitcoin information in the application program 31 for being the aforementioned checkout information. Whenever the consumer wants to check out the demanded item(s) of merchandise, the checkout system 5 may proceed to perform the checkout action based on any one of the aforementioned checkout information. In another embodiment, when the consumer wants to check out the demanded item(s) of merchandise, the checkout system 5 may calculate a checkout amount according to all the merchandise information 41 recorded in the virtual shopping cart and display the calculated checkout amount on the mobile device 3, therefore the consumer may go to a front desk (not shown) of the physical store and use cash to complete the checkout action based on the checkout amount.

In particular, by using the shopping system 1 of the present invention, the consumer may treat the mobile device 3 with the application program 31 as a movable point of sales (PoS), so as to effectively simplify the shopping procedure and reduce the time cost demanded by the checkout action.

As shown in FIG. 1, the shopping system 1 of the present invention may include a logistic system 6, which is connected to and communicates with the cloud server 4 through the Internet. In particular, the logistic system 6 is capable of bilateral communication and data inquiring with other ends of the shopping system 1 (such as the mobile device 3, the scanning apparatus 2, the checkout system 5, etc.) through the Internet. After the mobile device 3 receives the external operation from the consumer (for example the above checkout button is touched) and completes the aforementioned checkout action, the logistic system 6 may receive the merchandise information 41 recorded in the virtual shopping cart from the application program 31 or the cloud server 4, and delivers the merchandise 7 that corresponds to the merchandise information 41 from a back-end warehouse directly to a designated address. In particular, the designated address may be the address input by the consumer while performing the checkout action, or the address that is pre-registered in the application program 31 before shopping, not limited thereto.

By using the shopping system 1 of the present invention, the consumer only needs to download and install the application program 31 on the mobile device 3, then the mobile device 3 is allowed to connect and communicate with the scanning apparatus 2, and the consumer may scan and obtain the data of the demanded merchandise 7 through the scanning apparatus 2 without changing any hardware of the mobile device. Besides, the scanning apparatus 2 scans barcodes or QR codes upon the merchandise 7 for obtaining the sensing data 71, and the barcodes or QR codes are originally embedded information of the merchandise 7, so the arrangements inside the physical stores need not be modified. Therefore, the consumers and the owners of the physical stores may establish and use the shopping system 1 of the present invention via a lowest cost, which is very convenient.

Also, though the consumer performs the physical shopping activity in physical stores, the merchandise 7 purchased by the consumer will be delivered directly from the back-end warehouse to the designated address by the logistic system 6, which means the consumer is freed from conveying the purchased merchandise 7 in the physical stores. As a result, the shopping system 1 of the present invention may reduce the time cost demanded by the staffs of the physical stores in organizing the shelves.

Figure 2:
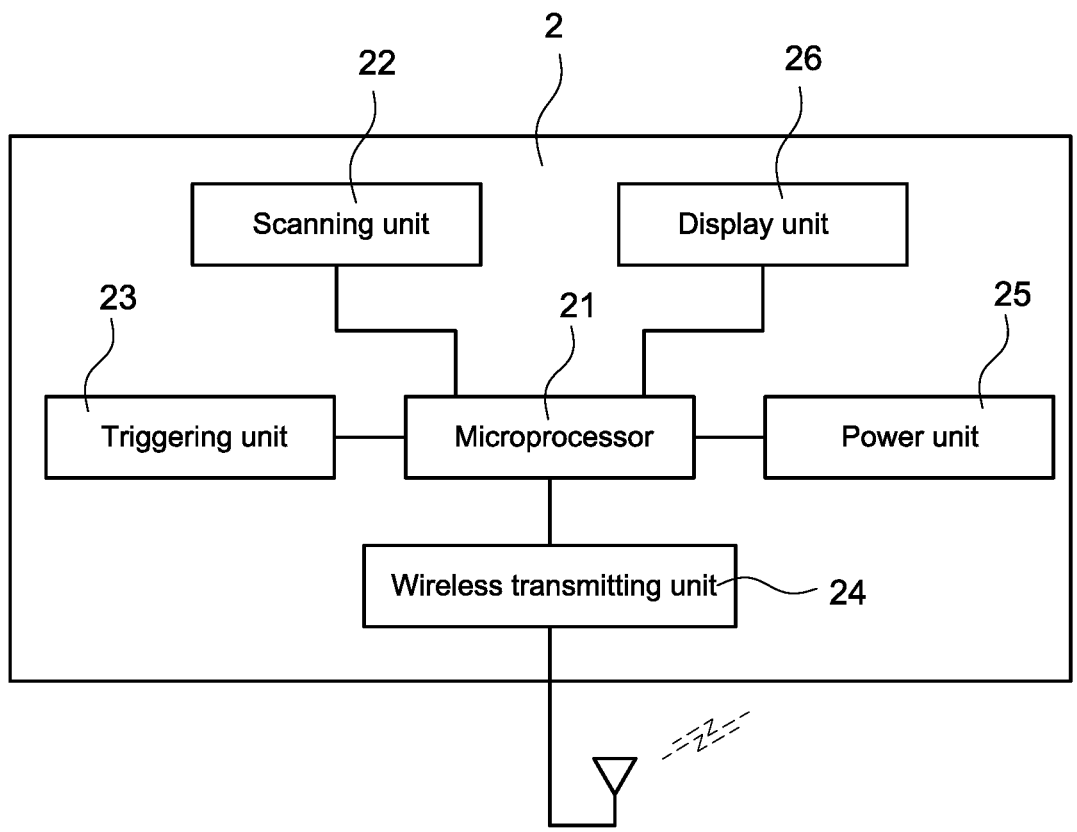
FIG. 2 is a block diagram of a scanning apparatus according to the first embodiment of the present invention.

FIG. 2 is a block diagram of a scanning apparatus according to the first embodiment of the present invention. As shown in FIG. 2, the scanning apparatus 2 of the present invention at least includes a microprocessor 21, a scanning unit 22, a triggering unit 23, a wireless transmitting unit 24, and a power unit 25, wherein the microprocessor 21 is electrically connected with the scanning unit 22, the triggering unit 23, the wireless transmitting unit 24, and the power unit 25 for integrating and controlling all of the units 22-25.

The scanning unit 22 may be an infrared sensing unit or a camera module, for detecting the sensing data 71 of an interesting merchandise 7. The triggering unit 23 may be physical buttons or touchable buttons. When the triggering unit 23 of the scanning apparatus 2 receives an external trigger from the consumer, it may send a controlling signal to the microprocessor 21 for the microprocessor 21 to control the scanning unit 22 to scan the sensing data 71 of the merchandise 7 (for example, to control the scanning unit 22 to illuminate infrared or to capture images of barcodes or QR codes).

The scanning apparatus 2 may establish a communicational connection with the cloud server 4 through the wireless transmitting unit 24. After the scanning unit 22 scans the merchandise 7 and obtains the sensing data 71 of the merchandise 7, the microprocessor 21 may further transmit the sensing data 71 to the cloud server 4 through the wireless transmitting unit 24, and thence the cloud server 4 may proceed to perform the following operations based on the received sensing data 71.

The power unit 25 is used to provide power to all the units 21-24 of the scanning apparatus 2 so the scanning apparatus 2 may operate. In one embodiment, the power unit 25 may be a lithium battery, but is not limited thereto.

As shown in FIG. 2, the scanning apparatus 2 may further include a display unit 26, which is electrically connected with the microprocessor 21. In one embodiment, the display unit 26 may be a light emitting diode (LED) for displaying the current status of the scanning unit 22, for example, the display unit 26 may display a red light when the scanning unit 22 is performing a scanning action, and may display a green light after the scanning unit 22 completes the scanning action and obtains the sensing data 71.

In another embodiment, the display unit 26 may be a liquid crystal display (LCD). After querying for and retrieving the merchandise information 41 corresponding to the scanned merchandise 7 according to the sensing data 71, the cloud server 4 may also transmit the retrieved merchandise information 41 to the scanning apparatus, and the scanning apparatus 2 may display the received merchandise information 41 through the display unit 26. Therefore, the consumer may solely use the scanning apparatus 2 while selecting interesting merchandises to purchase without frequently checking the mobile device 3. That is to say, the shopping system 1 of the present invention may provide more convenient experiences in the shopping activities for the consumer.

Figure 4A:
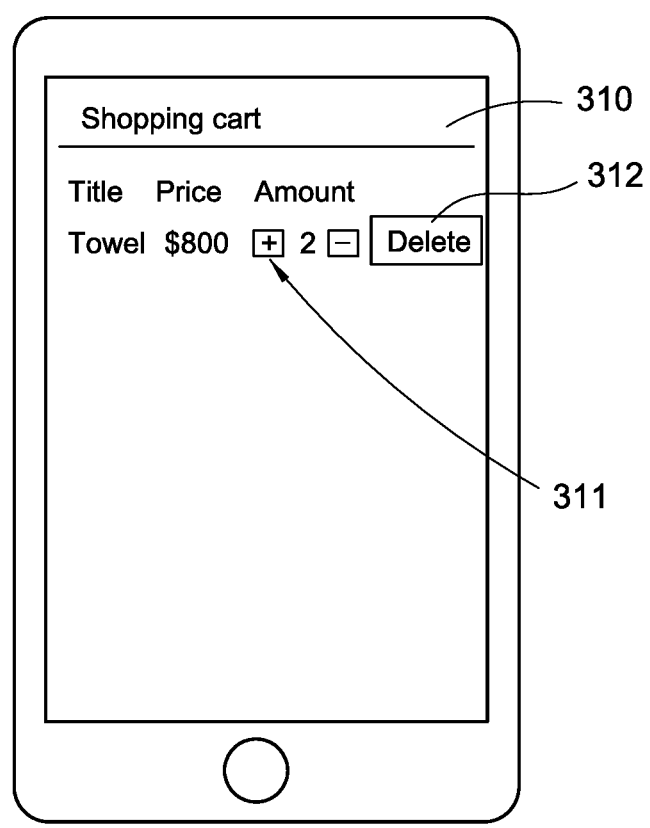
FIG. 4A is a schematic diagram showing an operation of a virtual shopping cart according to the first embodiment of the present invention.
Figure 4B:
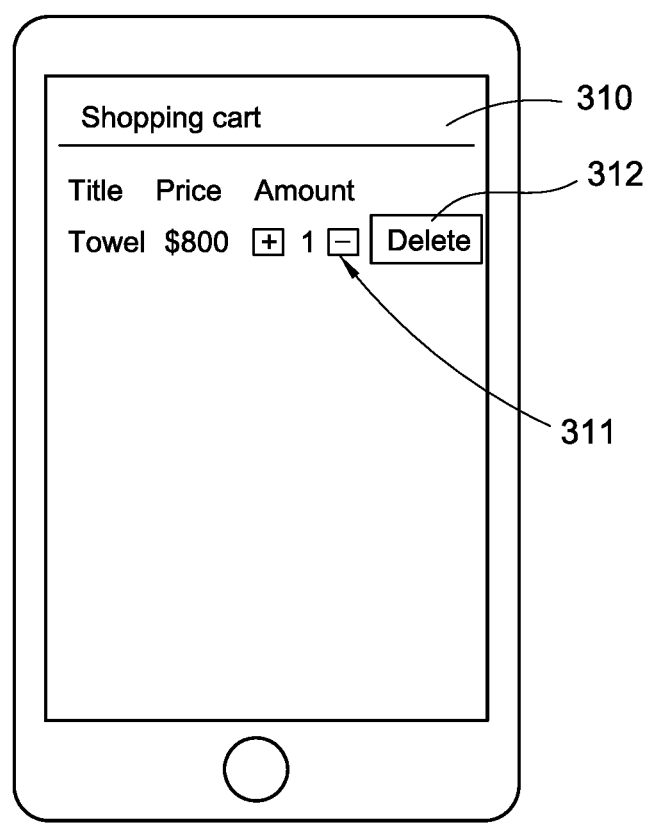
FIG. 4B is a schematic diagram showing an operation of the virtual shopping cart according to a second embodiment of the present invention.
Figure 4C:
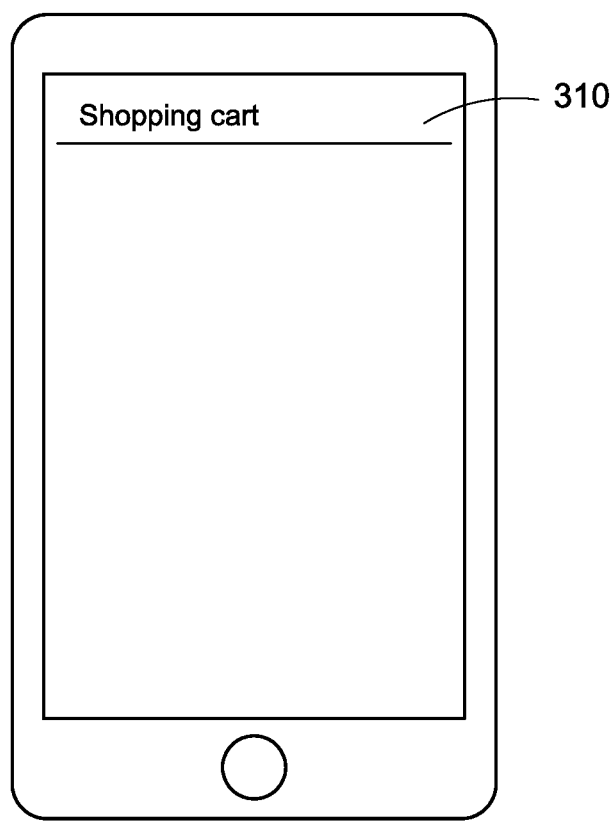
FIG. 4C is a schematic diagram showing an operation of the virtual shopping cart according to a third embodiment of the present invention.

Please refer to FIG. 4A to FIG. 4C, which are schematic diagrams showing an operation of a virtual shopping cart according to the first embodiment, a second embodiment, and a third embodiment of the present invention.

In one embodiment, the application program 31 may provide a shopping cart displaying page 310, the shopping cart displaying page 310 is used to display the merchandise information 41 transmitted from the cloud server 4 to the mobile device 3. In particular, the shopping cart displaying page 31 is used to display all the merchandise information 41 being added to the virtual shopping carts by the cloud server 4.

The aforementioned shopping cart displaying page 310 may provide editing options 311, 312, which may receive triggers from the consumer for editing the merchandise information 41 already recorded in the virtual shopping cart.

As shown in FIG. 4A and FIG. 4B, when the consumer uses the scanning apparatus 2 to scan the sensing data 71 of the merchandise 7 (such as a towel), the cloud server 4 may add the merchandise 7 into the virtual shopping cart (i.e., adds one towel into the virtual shopping cart). By triggering the aforementioned editing option 311, the consumer is allowed to directly change the amount of the merchandise 7 in the virtual shopping cart. If the consumer wants to purchase several of the same merchandise 7, he or she only needs to scan the sensing data 71 of the merchandise 7 once, and then trigger the editing option 311 to change the amount of the merchandise 7 that is already added to the virtual shopping cart. Therefore, the consumer doesn't need to scan the sensing data 71 of the merchandise 7 for several times, which is very convenient and not time-consuming. Otherwise, if the consumer wants to subtract the amount of the merchandise 7 that is already added to the virtual shopping cart, he or she may accomplish the subtraction via simply triggering the editing option 311 as well.

As shown in FIG. 4C, if the consumer doesn't want to purchase any of the merchandise 7 that is already added to the virtual shopping cart, he or she may easily remove the merchandise 7 (or all of the merchandise 7) from the virtual shopping cart by triggering the editing option 213.

Figure 5A:
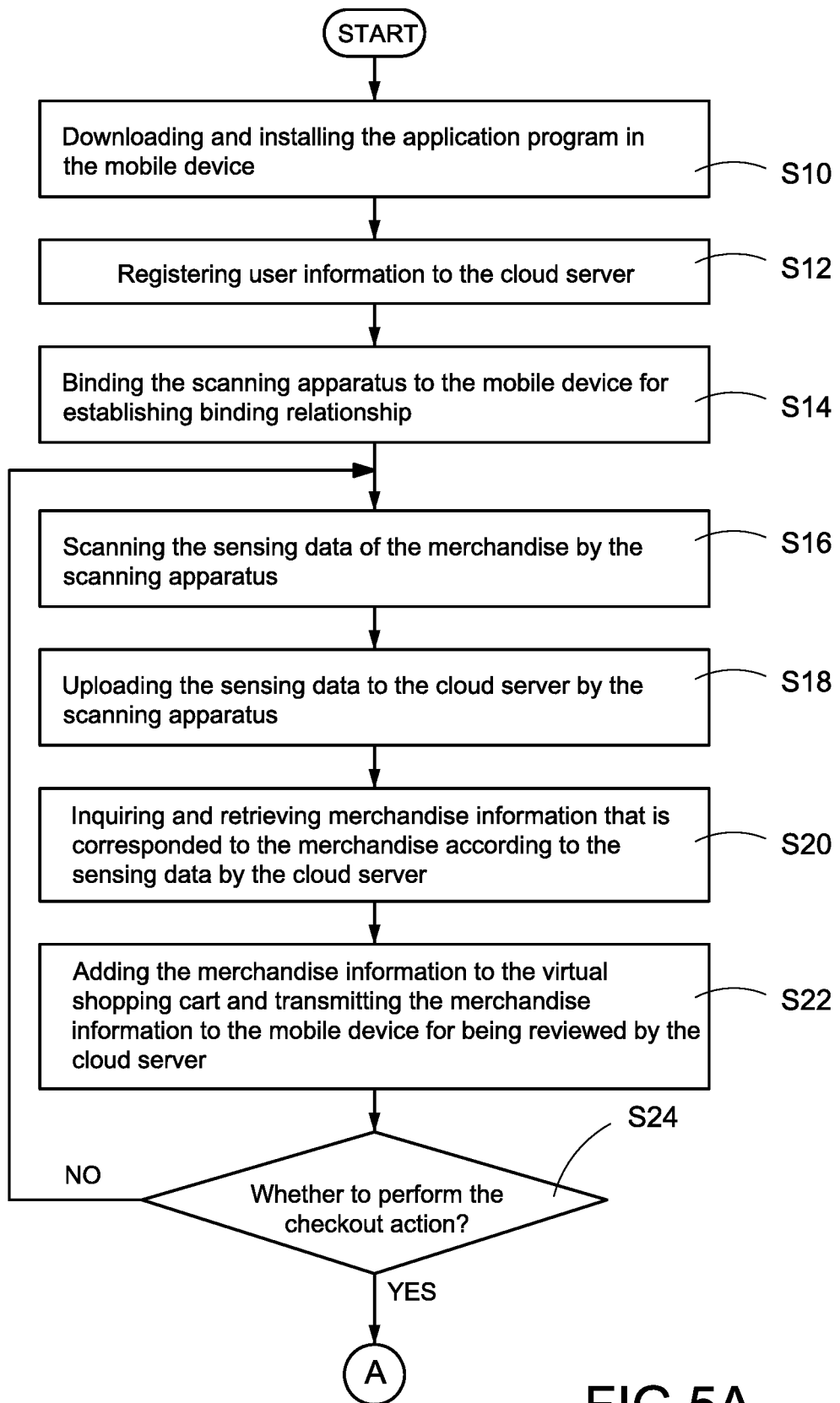
FIG. 5A is a first shopping flowchart according to the first embodiment of the present invention.
Figure 5B:
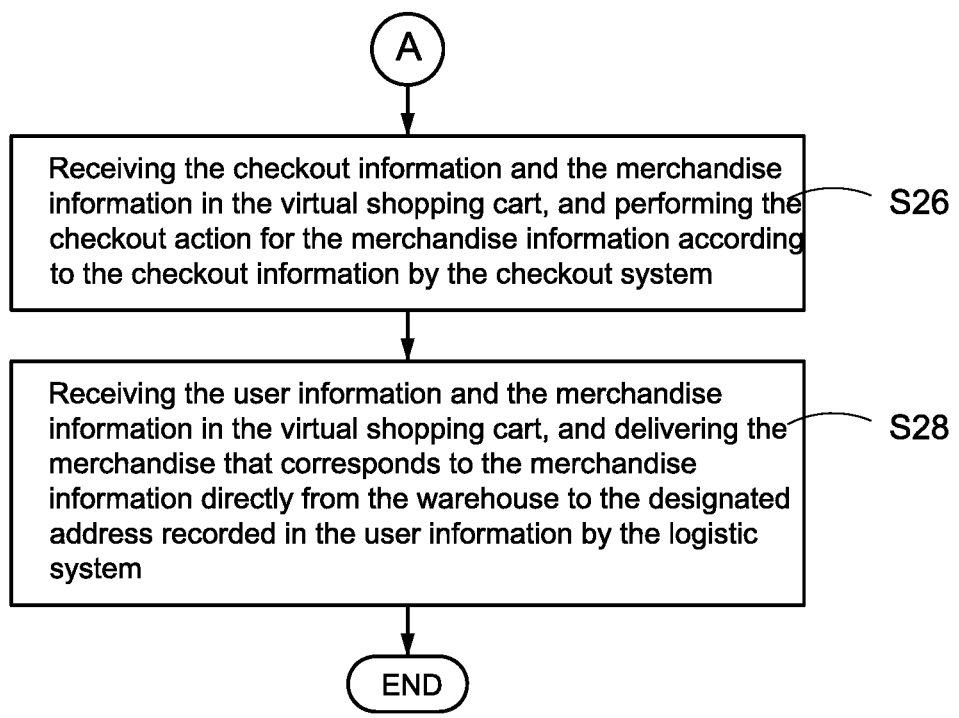
FIG. 5B is a second shopping flowchart according to the first embodiment of the present invention.

FIG. 5A is a first shopping flowchart according to the first embodiment of the present invention, FIG. 5B is a second shopping flowchart according to the first embodiment of the present invention. The present invention further discloses an intellectual shopping method (referred to as the shopping method hereinafter), the shopping method is basically adopted by the shopping system 1 shown in FIG. 1. First, a user may download and install the aforementioned application program 31 in the mobile device 3 (step S10). In the embodiment, the application program 31 is created and provided by a developer of the shopping system 1. After installing and executing the application program 31, the mobile device 3 is able to register user information of the user to the cloud server 4 (step S12).

In one embodiment, the aforementioned user information may include, but is not limited to, a user account, a password, a user name, a phone number, a designated address, a member serial number, checkout information, etc. After the user information is/are registered completely, the user may bind the scanning apparatus 2 to the mobile device 3 for establishing a binding relationship between the scanning apparatus 2 and the mobile device 3 (step S14). Therefore, after the user uses the scanning apparatus 2 to scan the sensing data 71 of the interesting merchandise 7, the cloud server 4 may directly obtain the identity of the user through the binding relationship, so as to transmit the merchandise information 41 corresponding to the scanned merchandise 7 to the mobile device 3 owned by the user, and proceeds to perform the checkout action and the delivering action for the merchandise 7 through the aforementioned checkout system 5 and logistic system 6.

In one embodiment, after being executed by the mobile device 3, the application program 31 may connect to the cloud server 4 and receive a set of identifiable verification information from the cloud server 4. Next, the application program 31 may generate a set of binding data according to the aforementioned user information and verification information, and displays the generated binding data on a screen of the mobile device 3. In this embodiment, the binding data may be displayed in a barcode format or in a QR code format.

When using the shopping system 1 of the present invention, the user first uses the scanning apparatus 2 to scan the binding data 3 displayed on the mobile device 3; thereafter the scanning apparatus 2 may obtain the user information and the verification information after decoding the binding data 3, and the scanning apparatus 2 may transmit the verification information to the cloud server 4 for further verification. After the verification is successfully completed by the cloud server 4, the scanning apparatus 2 may be bound to the mobile device 3. Therefore, all the merchandises 7 that are selected and scanned by the scanning apparatus 2 may all be queried for and checked out by using the mobile device 3 that is bound to the scanning apparatus 2, which is very convenient.

In another embodiment, the scanning apparatus 2 may include a Bluetooth unit (not shown) electrically connected with the microprocessor 21. When the user is using the shopping system 1, the scanning apparatus 2 may wirelessly connect with the mobile device 3 through the Bluetooth unit, therefore the scanning apparatus 2 may receive aforementioned user information and verification information from the mobile device 3. Next, the scanning apparatus 2 may further transmit the verification information to the cloud server 4 to perform further verification. If the verification is successfully completed by the cloud server 4, the scanning apparatus 2 may be allowed to bind to the mobile device 3. However, the above descriptions are just few examples of the exemplary embodiments of the present invention, the binding approaches of the shopping system 1 are not limited thereto.

After the step S14, the user may perform the physical shopping activities in the physical stores, and uses the scanning apparatus 2 to scan the sensing data 71 of any interesting merchandise 7 (step S16). Next, the scanning apparatus 2 uploads the obtained sensing data 71 to the cloud server 4 (step S18), and the cloud server 4 may receive the sensing data 71, and query its internal database according to the received sensing data 71 in order to retrieve the merchandise information 41 that corresponds to the scanned merchandise 7 (step S20). Besides, the cloud server 4 may further add the retrieved merchandise information 41 to the user's virtual shopping cart, and transmits the merchandise information 41 to the mobile device 3 for being reviewed by the user (step S22).

Next, the application program 31 of the mobile device 3 may determine if the user wants to proceed with the checkout action for the merchandise information 41 of the virtual shopping cart (step S24), i.e., the application program 31 determines whether it receives the external operation from the user or not (for example, if the user triggers the checkout button provided by the application program 31 or not). If the user doesn't perform any external operation that can trigger the checkout action, the shopping system 1 goes back to the step S16 for allowing the user to keep selecting and scanning interesting merchandises 7 by using the scanning apparatus 2.

If the user does perform an external operation that can trigger the checkout action, the application program 31 proceeds to perform the checkout action for all the merchandise information 41 currently recorded in the virtual shopping cart. In particular, after the application program 31 receives the external operation from the user, the checkout system 5 may receive the checkout information that is pre-registered by the user and all the merchandise information 41 recorded in the virtual shopping cart from the application program 31 or the cloud server 4. Therefore, the checkout system 5 may perform the checkout action for all the received merchandise information 41 according to this checkout information, such as credit card information, Alipay information, ApplePay information, Bitcoin information, etc. (step S26). In this manner, time-consuming actions such as waiting in line for checking out at the front desk of the physical stores and waiting for the payment by cash can be omitted.

After the checkout system 5 completes the checkout action, the logistic system 6 may also receive the user information that is pre-registered by the user and all the merchandise information 41 recorded in the virtual shopping cart from the application program 31 or the cloud server 4. Therefore, the logistic system 6 may deliver the merchandise 7 that correspond to the received merchandise information 41 directly from a back-end warehouse to a designated address recorded in the user information (step S28). Therefore, the inconvenience of conveying the merchandises purchased by the user can be also avoided.

The intellectual shopping system and intellectual shopping method of the present invention may provide both the joy of physical shopping activities and the convenience of online shopping activities, and prevents the consumers from bearing all the inconveniences brought by traditional physical shopping activities and traditional online shopping activities.

As the skilled person will appreciate, various changes and modifications can be made to the described embodiment. It is intended to include all such variations, modifications and equivalents which fall within the scope of the present invention, as defined in the accompanying claims.

What is claimed is:

1. An intellectual shopping system, comprising:
a scanning apparatus for scanning sensing data of a merchandise;
an application program installed in a mobile device which executes the application program to bind to the scanning apparatus;
a cloud server connected to and communicated with the scanning apparatus and the mobile device, the cloud server receiving the sensing data from the scanning apparatus, querying a database for merchandise information that corresponds to the merchandise based on the sensing data, adding the merchandise information to a virtual shopping cart and transmitting the merchandise information to the mobile device to be reviewed; and
a logistic system connected to and communicating with the cloud server;
wherein the mobile device receives an external operation through the application program to perform a checkout action for the merchandise information recorded in the virtual shopping cart, the logistic system receives the merchandise information of the virtual shopping cart from the cloud server and delivers the merchandise that corresponds to the received merchandise information from a back-end warehouse to a designated address;
wherein the application program is configured to record user information of a user of the mobile device and receive verification information from the cloud server, and the application program is configured to generate binding data according to the user information and the verification information for displaying on the mobile device, and the scanning apparatus is configured to scan the binding data displayed on the mobile device to bind to the mobile device.

2. The intellectual shopping system in claim 1, wherein the sensing data is recorded in a barcode format or in a QR code format.

3. The intellectual shopping system in claim 1, further comprises a checkout system connected to and communicating with the cloud server, wherein when the mobile device receives the external operation, the checkout system proceeds to perform the checkout action for the merchandise information recorded in the virtual shopping cart based on checkout information pre-registered in the mobile device.

4. The intellectual shopping system in claim 3, wherein the checkout information is credit card information, Alipay information, ApplePay information or Bitcoin information.

5. The intellectual shopping system in claim 1, wherein the scanning apparatus comprises:
   a microprocessor;
   a scanning unit electrically connected with the microprocessor;
   a triggering unit electrically connected with the microprocessor, controlling the scanning unit to scan externally the sensing data of the merchandise when receiving an external trigger;
   a wireless transmitting unit electrically connected with the microprocessor, connected to and communicating with the cloud server for wirelessly transmitting the sensing data to the cloud server; and
   a power unit electrically connected with the microprocessor, providing power for the scanning apparatus to operate.

6. The intellectual shopping system in claim 5, wherein the scanning apparatus further comprises a display unit, wherein the display unit is electrically connected with the microprocessor and displays a current status of the scanning unit.

7. The intellectual shopping system in claim 6, wherein the display unit is a liquid crystal display (LCD), and the scanning apparatus receives the merchandise information from the cloud server through the wireless transmitting unit and displays the received merchandise information through the display unit.

8. The intellectual shopping system in claim 1, wherein the application program provides a shopping cart displaying page for displaying the merchandise information transmitted from the cloud server, and the shopping cart displaying page comprises at least one editing option for editing the merchandise information currently recorded in the virtual shopping cart.

9. An intellectual shopping method adopted by the intellectual shopping system in claim 1, comprising the following steps:
   a01) downloading and installing an application Program by a mobile device;
   a02) executing the application program by the mobile device for registering user information of a user;
   a031) receiving verification information from a cloud server by the application program;
   a032) generating binding data according to the user information and the verification information for displaying on the mobile device by the application program;
   a033) scanning the binding data displayed on the mobile device by a scanning apparatus for the scanning apparatus to bind to the mobile device;
   a) scanning sensing data of an item of merchandise by the scanning apparatus, wherein the scanning apparatus is bound to the mobile device;
   b) uploading the sensing data to the cloud server by the scanning apparatus;
   c) querying a database for merchandise information that corresponds to the merchandise according to the sensing data, adding the merchandise information to a virtual shopping cart, and transmitting the merchandise information to the mobile device by the cloud server to be reviewed;
   d) displaying the merchandise information received from the cloud server by the application program executed in the mobile device;
   e) receiving an external operation by the application program of the mobile device to perform a checkout action for the merchandise information currently recorded in the virtual shopping cart; and
   f) receiving the merchandise information of the virtual shopping cart from the cloud server and delivering the merchandise that corresponds to the merchandise information from a back-end warehouse to a designated address by a logistic system following the step e).

10. The intellectual shopping method in claim 9, further comprising a step g): performing the checkout action for the merchandise information in the virtual shopping cart according to checkout information that is pre-registered in the mobile device by a checkout system following the step e), wherein the checkout information is credit cart information, Alipay information, ApplePay information or Bitcoin information.

11. An intellectual shopping system, comprising:
   a scanning apparatus for scanning sensing data of a merchandise;
   an application program installed in a mobile device which executes the application program to bind to the scanning apparatus;
   a cloud server connected to and communicating with the scanning apparatus and the mobile device, the cloud server receiving the sensing data from the scanning apparatus, querying a database for merchandise information that corresponds to the merchandise based on the sensing data, adding the merchandise information to a virtual shopping cart and transmitting the merchandise information to the mobile device to be reviewed; and
   a logistic system connected to and communicated with the cloud server;
   wherein the mobile device receives an external operation through the application program to perform a checkout action for the merchandise information recorded in the virtual shopping cart, the logistic system receives the merchandise information of the virtual shopping cart from the cloud server and delivers the merchandise that corresponds to the received merchandise information from a back-end warehouse to a designated address;
   wherein the application program is configured to record user information of a user of the mobile device and receive verification information from the cloud server, and the scanning apparatus comprises a Bluetooth unit, the scanning apparatus is configured to communicationally connect with the mobile device through the Bluetooth unit for receiving the user information and the verification information from the mobile device and bind to the mobile device according to the received user information and verification information.

12. The intellectual shopping system in claim 11, wherein the sensing data is recorded in a barcode format or in a QR code format.

13. The intellectual shopping system in claim 11, further comprising a checkout system connected to communicating with the cloud server, wherein when the mobile device receives the external operation, the checkout system proceeds to perform the checkout action for the merchandise information recorded in the virtual shopping cart based on checkout information pre-registered in the mobile device.

14. The intellectual shopping system in claim 11, wherein the scanning apparatus comprises:
- a microprocessor electrically connected with the Bluetooth unit;
- a scanning unit electrically connected with the microprocessor;
- a triggering unit electrically connected with the microprocessor, controlling the scanning unit to scan externally the sensing data of the merchandise when receiving an external trigger;
- a wireless transmitting unit electrically connected with the microprocessor, connected to and communicated with the cloud server for wirelessly transmitting the sensing data to the cloud server;
- a power unit electrically connected with the microprocessor, providing power for the scanning apparatus to operate; and
- a display unit electrically connected with the microprocessor, displaying a current status of the scanning unit.

15. The intellectual shopping system in claim 11, wherein the application program provides a shopping cart displaying page for displaying the merchandise information transmitted from the cloud server, and the shopping cart displaying page comprises at least one editing option for editing the merchandise information currently recorded in the virtual shopping cart.

* * * * *